Feb. 27, 1962   R. FRIEDMAN   3,023,266
ENDBELLS FOR EXTENSION CONNECTORS
Filed Sept. 23, 1959
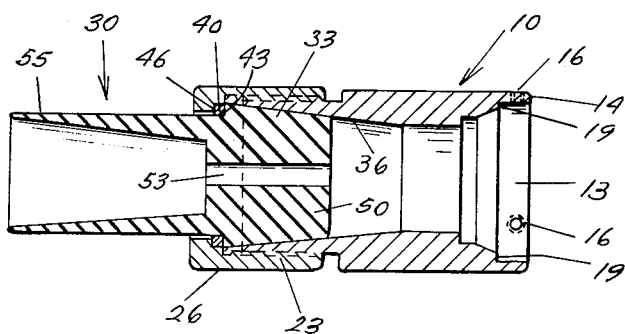
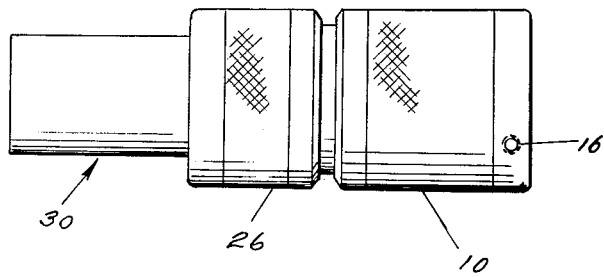
INVENTOR.
ROBERT FRIEDMAN
BY
ATTORNEYS

United States Patent Office 3,023,266
Patented Feb. 27, 1962

3,023,266
ENDBELLS FOR EXTENSION CONNECTORS
Robert Friedman, Brooklyn, N.Y., assignor to Kollsman Instrument Corporation, Elmhurst, N.Y., a corporation of New York
Filed Sept. 23, 1959, Ser. No. 841,888
1 Claim. (Cl. 174—75)

This invention relates to extension connectors and more particularly to an endbell therefor.

In prior art construction endbells have been utilized for the purpose of maintenance of connections between multi-prong male and female elements. The purpose of such endbells was to afford a grip on both of the elements to insure integral relationship of the male and female components. However, in prior art constructions undue stresses were placed on the component carried within by the endbell; namely, the female component, into which the prongs of the male component were inserted. Such undue stresses were brought about by gripping the cable as it emerged from the endbell, with a metallic collar which produced abrasion and sharp bends likely to cause breakage under conditions of repetitive bending and rough handling.

The present invention seeks to overcome the drawbacks of the prior art and it is an object of the invention to provide an endbell construction suitable for gripping either the male or female component of a multi-prong connector element so as to mechanically reinforce the connection between such component and the cable extending therefrom.

It is another object of the invention to provide an endbell construction which may be economically manufactured, readily assembled in conjunction with a multi-prong connector, or disassembled, and which will preserve the cable as well as its connection with the respective connector.

Briefly, my invention comprises the use of a tubular closed body endbell, open at both ends, wherein a connector may be accommodated within the closed interior and another connector inserted in one end and secured thereto as by set screws. The other end of the endbell is tightly fitted with a flexible boot which may be of rubber or other flexible material such as certain kinds of plastic. An end cap is utilized to securely hold the boot in the respective end of the endbell and the cable of the connector passes through a bore in the boot having a snug fit with such bore. The boot is provided with a skirt encompassing the cable for a predetermined distance beyond the endbell to fully protect the cable against kinking in the vicinity of the endbell and against abrasion.

A detailed description of my invention will now be given in conjunction with the appended drawing in which:

FIGURE 1 is a longitudinal cross-section through an endbell comprising the component of my invention; and FIGURE 2 is an exterior view thereof.

Referring now to the drawing, my invention comprises a closed body endbell 10 of generally tubular shape, preferably of metal, having an open end 13 provided with a shoulder 19 and a rim 14 through which protrude one or more set screws 16.

The other end of the endbell is provided with threads at 23 for co-acting with a metallic threaded cap 26. A boot 30, which may be of any flexible material, for example, rubber or polyethylene plastic, is securely gripped within the endbell by virtue of a tapered exterior surface 33 mating with a complementary, internally-tapered surface 36 of endbell 10, as shown. Cap 26 is drawn up tightly, by virtue of its threads, onto the exterior of endbell 10 and a metallic thrust ring 40 is utilized intermediate the cap and the boot for bringing longitudinal pressure against the boot to force it tightly into the endbell. Thus, the ring 40 engages a shoulder 43 provided peripherally around the boot at the end of the tapered section and also engages a shoulder 46 extending inwardly around the outer opening of cap 26. By providing the ring 40, torsional stress on the relatively soft shoulder 43 is avoided, and abrasive wear minimized.

The boot 30 is provided with a relatively massive, solid head 50, although having a bore 53 to accommodate a cable which may be passed therethrough from a connector element. The cable is protected for a predetermined distance by an encompassing, spaced skirt 55 which is an integral portion of the boot. The skirt 55 tapers to a narrowed cross-section at its outer end to enhance flexibility and bending thereof with the cable as required in use.

Having thus described my invention, I am aware that various changes may be made therein without departing from the spirit thereof, and accordingly, I do not seek to be limited to the precise illustration herein given except as set forth in the appended claim.

I claim:

An endbell device comprising the combination of a tubular body endbell, a flexible boot, and means for securing said flexible boot to said tubular body endbell; said tubular body endbell having an opening at each end thereof and having means within said opening at one end of said endbell for gripping a connector component partially inserted within said opening; said flexible boot having a relatively massive head portion at one end thereof integral with an extending skirt extending toward the other end thereof; said relatively massive head portion of said flexible boot being inserted into the other end of said tubular body endbell and substantially filling said last mentioned opening of said endbell; said relatively massive head of said flexible boot having a tapered exterior portion; said last mentioned opening of said tubular body endbell having a taper complementary with said taper of said relatively massive head portion whereby said relatively massive head portion is held in fixed relationship with respect to tubular body endbell; said flexible boot having a centrally located aperture extending through said relatively massive head portion for receiving and gripping conductor means extending from said one end of said tubular body endbell to the end of said skirt of said flexible boot; said skirt having an internal tapered opening increasing in diameter towards the end of said skirt to a narrow cross-section at said end of said skirt; said means for securing said boot to said tubular body endbell including a cap threadably connected to said endbell body and disposed to force said relatively massive head portion of said boot into the tapered interior portion of said tubular body endbell.

References Cited in the file of this patent

UNITED STATES PATENTS

| | | |
|---|---|---|
| 2,523,741 | Weschler et al. | Sept. 26, 1950 |
| 2,524,534 | Morris et al. | Oct. 3, 1950 |
| 2,877,436 | Dupee et al. | Mar. 10, 1959 |
| 2,946,035 | Tuchel | July 19, 1960 |

FOREIGN PATENTS

| | | |
|---|---|---|
| 204,390 | Australia | Nov. 16, 1956 |